United States Patent [19]

Bailey

[11] 4,301,454

[45] Nov. 17, 1981

[54] CHANNELIZED RECEIVER SYSTEM

[75] Inventor: Donald E. Bailey, Newbury Park, Calif.

[73] Assignee: Bunker Ramo Corporation, Oak Brook, Ill.

[21] Appl. No.: 98,883

[22] Filed: Nov. 30, 1979

[51] Int. Cl.³ .................... G01S 7/36; G01R 23/165
[52] U.S. Cl. .......................... 343/18 E; 324/77 E; 343/5 SA; 455/303
[58] Field of Search ............... 343/5 SA, 18 E; 324/77 E; 455/226, 303

[56] References Cited

U.S. PATENT DOCUMENTS

| | | | |
|---|---|---|---|
| 3,215,934 | 11/1965 | Sallen | 324/77 E |
| 3,422,348 | 1/1969 | Gutleber | 324/77 E |
| 3,731,188 | 5/1973 | Smith | 324/77 E |
| 4,188,628 | 2/1980 | Langeraar | 343/5 SA |

Primary Examiner—T. H. Tubbesing
Attorney, Agent, or Firm—N. A. Camasto; A. Freilich

[57] ABSTRACT

A channelized receiver system for use in conjunction with a scanning antenna wherein a received rf signal is provided to a plurality of filters each of which has a passband corresponding to a portion of a search bandwidth. The filter output signals are processed to provide a signal related to the frequency of the received rf signal for tuning a narrow band, superheterodyne/receiver to the frequency of the received rf signal. More particularly, the received rf signal is divided so that a first portion is applied to a first group of filters, and a second portion applied to a second group of filters. The filters in each group have passbands defining non-contiguous portions of the search bandwidth. The invention also provides a voting logic circuit in which outputs from each of the filters in each filter group are processed to determine which filter in each group has the highest output signal. Circuitry is provided for comparing these output signals to predetermined amplitude and width criteria. If the output signals pass these comparison tests, then the difference between the amplitude of the highest output signal from each of the two filter groups is provided to a computer which then generates a tuning signal for the narrow band, superheterodyne analysis receiver.

19 Claims, 8 Drawing Figures

CHANNELIZED RECEIVER SYSTEM

BACKGROUND OF THE INVENTION

The invention relates to rf receivers and more particularly to a channelized receiver for determining the frequency of a received rf signal.

A frequent problem encountered in high sensitivity, narrow band radar intercept receivers is to tune them to receive a signal having an unknown frequency. Reducing the bandwidth of a receiver generally increases its sensitivity, but results in tuning difficulties because the narrow bandwidth must be more precisely centered with respect to the incoming signal. One way conventional radar intercept receiving systems have tried to eliminate this problem is to search for the unknown signal with a less sensitive wide band receiver, and, once having detected a signal, tune a narrow band receiver to the detected signal. As the signal-to-noise ratio of the unknown signal becomes lower, the more difficult it is to utilize this method. In addition, it is usually desirable to rapidly identify the unknown signal in order to quickly tune the narrow band receiver to that frequency. Accordingly, channelized receivers having a plurality of filters each defining a contiguous passband portion of a search bandwidth have been utilized to quickly identify a channel in which an unknown signal lies, this channel then being used to identify a tuning frequency for a narrow band receiver. However, as the dynamic range of an unknown input signal increases, it becomes more difficult to determine the frequency of the signal without the use of complicated and complex redundancy comparison circuitry which is required when strong input signals provide output signals of substantially equal magnitude at two or more of the channelizer filters.

SUMMARY OF THE INVENTION

The present invention solves the aforementioned problems by providing a simplified channelized receiver having a voting logic circuit which is utilized to identify not only the filter channel in which the unknown signal is appearing, but the specific frequency location within that channel by comparing the magnitude of the filter channel having the highest output signal with the magnitude of an adjacent filter channel having the next highest output signal. The difference beween these two output signals provides a number from which a computer can determine the precise frequency of an incoming signal.

More particularly, the invention provides a channelized receiver having a channelizer comprising a plurality of filter means each of which defines a passband covering a portion of a predetermined search bandwidth. The plurality of filter means are divided into at least two groups of filters, each group containing filters which define alternate portions of a search bandwidth with respect to the filters of another group. A received rf signal is split and provided to each of the filter groups. The channelized receiver further includes a voting logic circuit having a means for determining the specific filter in each group having the highest output signal and a means for comparing the amplitude relationship between these output signals, this amplitude relationship being related to the frequency of the received rf signal.

In a specific embodiment of the invention in which the filters are divided into two groups, the voting logic circuit provides a means for testing both the amplitude and width of output signals from each of the filter means against predetermined criteria before processing the signal. An "inband" signal is also generated by the voting logic circuit when certain predetermined criteria have been satisfied, the in band signal being used to determine if a narrow band receiver tuning signal should be generated by the computer. The particular predetermined criteria chosen for this exemplary embodiment include determining that the output signal of each filter is not above a predetermined value, determining that the filter in the first group and the filter in the second group having the highest amplitude output signals define adjacent portions of the search bandwidth, and determining that neither of these output signals are within a predefined guard bandwidth portion. The computer is programmed with predetermined frequency response characteristics of each of the filters in order to utilize the amplitude relationship information to determine the frequency of the receiver rf signal.

In a further embodiment of the invention, the channelized receiver is utilized in conjunction with a wide band discriminator, the wide band discriminator providing frequency information when the received rf signal is of such a magnitude that it would result in an ambiguous frequency determination using the filters. The channelized receiver provides frequency information when the signal level of the incoming signal is too low to be accurately utilized by the wide band discriminator.

DETAILED DESCRIPTION

As required, detailed illustrative embodiments of the invention disclosed herein exemplify the invention and are currently considered to be the best embodiment for such purposes. However, it is to be recognized that other means could be utilized for processing the outputs of the filter groups to determine the filter within each group having the strongest output signals. Accordingly, the specific embodiments disclosed are only representative in providing a basis for the claims which define the scope of the present invention.

As previously explained, the invention provides a channelized receiver for determining the frequency of a received rf signal so that a second narrow band, high sensitivity receiver can be tuned to that frequency. The channelized receiver has a plurality of rf filters each of which has a passband comprising a portion of a predetermined search bandwidth in which the received rf signal lies. The filter passbands are chosen so that together they cover the predetermined search bandwidth. The filters are divided into at least two alternating filter groups, each group defining alternate portions of the search bandwidth. In the exemlary embodiment described below, two filter groups are utilized, the received rf signal being divided and provided to each filter group. A voting logic circuit is provided which processes the output signals of each of the filters to determine the filter in each group having the highest output signal. If these two filters have passbands defining contiguous portions of the search bandwidth, then the two filter output signals are utilized by a computer to define a precise frequency of the received rf signal. The computer then provides a tuning signal for the narrow band receiver.

Figure 1:
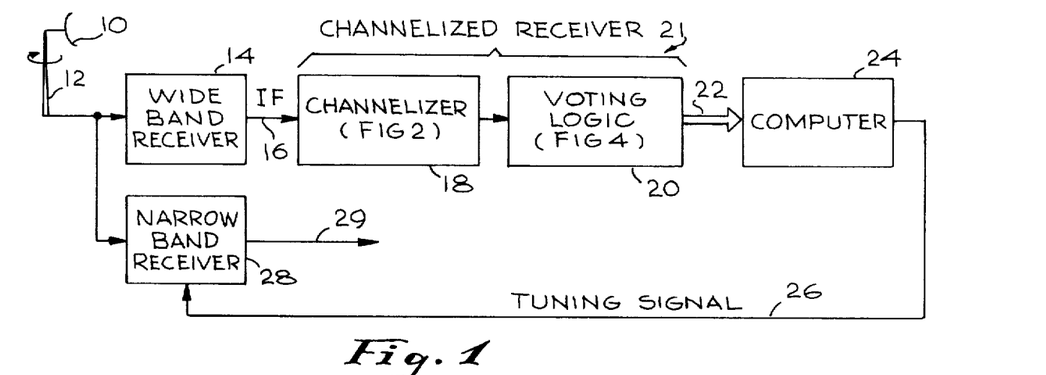
FIG. 1 is a block diagram of a receiving system incorporating a channelized receiver provided by the invention.

A typical use of the channelized receiver provided by the invention is shown in FIG. 1. An antenna 10 is continually rotated about a mounting structure 12. As it is rotated, a source of rf energy (not shown), which could be a continuous source or a pulsating source, radiates an rf signal received by the antenna 10 and provided to a wide band receiver 14 having a predetermined search bandwidth which includes the frequency of the received rf signal. An output IF signal 16 from the wide band receiver 14 is supplied to a channelizer 18 provided by the invention. The channelizer 18 and a voting logic circuit 20 together form a channelized receiver 21 provided by the invention. The voting logic circuit 20 provides output signals 22 to a computer 24 which is related to the frequency of the received rf signal from the wide band receiver 14. The computer 24 then generates a tuning signal 26 which is used to tune a narrow band receiver 28 having an output signal 29 with a higher signal to noise ratio than that obtainable with the wide band receiver 14. In operation, the wide band receiver 14 provides an IF signal 16 having a frequency related to the frequency of the received rf signal to a plurality of filters contained in the channelizer 18 and configured as will be explained below. Each filter output signal from the channelizer 18 is provided to the voting logic circuit 20 which provides output signals 22 defining two filter channels having the highest output signals and their amplitude difference. The computer 24 has been preprogrammed with the passband characteristics of each filter, thereby allowing it to calculate the frequency of the received rf signal and to generate the narrowband receiver tuning signal 26.

Figure 2:
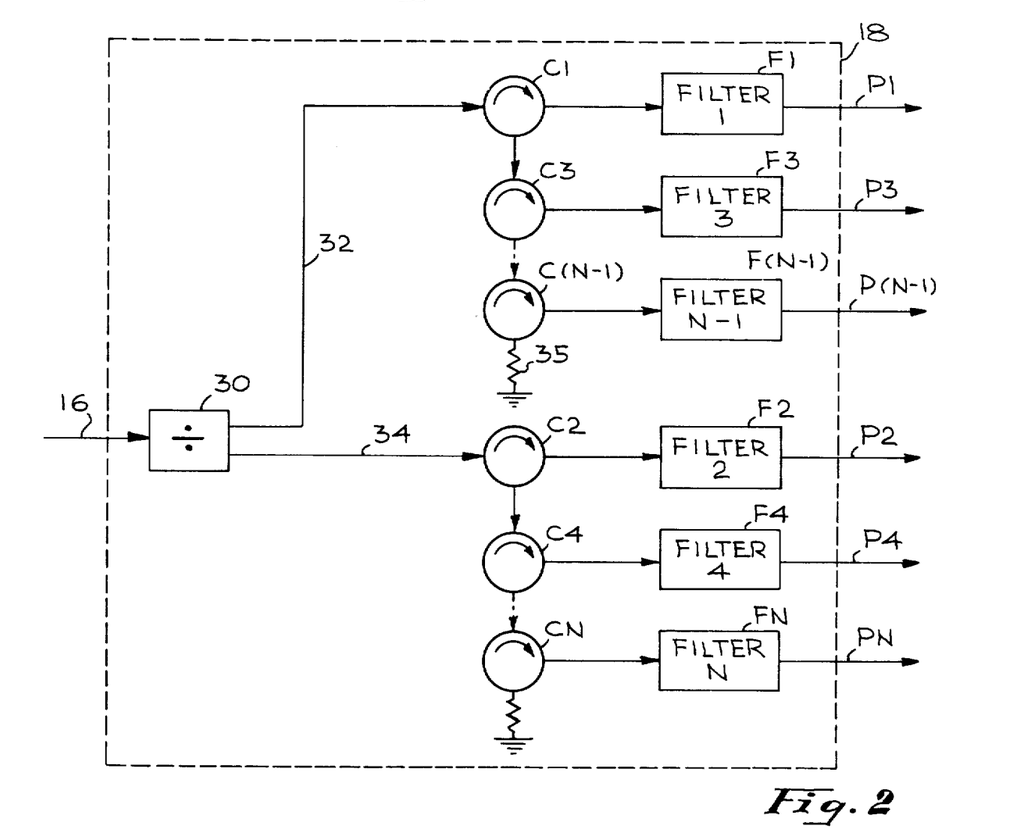
FIG. 2 is a block of the channelizer shown in FIG. 1.
Figure 3:
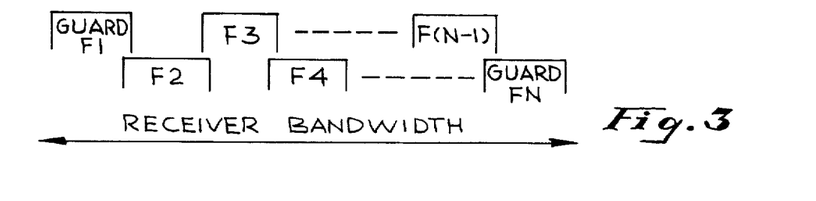
FIG. 3 is a diagrammatic representation of the relationship between the passbands of the filters shown in FIG. 2.

Referring to FIG. 2, the channelizer 18 includes a power splitter 30 which divides the IF signal 16 into first and second portion 32 and 34, respectively. A plurality of rf filters F1 through FN are provided, N being any even number. The odd numbered filters F1, F3, . . . F(N−1), are connected to the IF signal first portion 32 through respective rf circulators C1, C3, . . . C(N−1). In a similar manner, the even numbered filters F2, F4, . . . FN, are connected through corresponding rf circulators C2, C4, . . . CN to the second portion 34 of the IF signal 34. The relationship of the passbands of the N filters with respect to each other is shown in FIG. 3. The first and last filter, F1 and FN, passbands are designated as guard bands for reasons to be explained below. Splitting of the filters F1 through FN into even and odd groupings serves two purposes. Firstly, it allows use of the rf circulators C1 through CN without the usual problems occurring in the vicinity of filter crossover. Secondly, it facilitates comparisons of filter output signals having adjacent passbands and allows a more precise determination of the received rf signal frequency as will be explained below.

Referring to the first group of filters F1, F3, etc., shown in FIG. 2, the IF signal first portion 32 enters the first circulator C1. The portion of the signal 32 within the passband of the first filter F1 passes directly therethrough as an output signal P1. Portions which do not pass through the first filter F1 are reflected back from the first filter F1 and through the first circulator C1 to the next circulator C3 where the process of selective passing and reflection is repeated. At the last circulator C(N−1), any unpassed portion of the IF signal first portion 32 is dissipated in a resistive load 35. The filters and circulators associated with the second portion 34 of the IF signal 16 operate in a similar manner, thus, each of the output signals P1, P3, . . . P(N−1) associated with the first portion 32 and each of the output signals P2, P4, . . . PN, associated with the second portion 34 is related to the frequency content of the received rf signal corresponding to the passbands of the filters F1-FN. The splitting of the IF signal 16 into two portions 32 and 34 provides a means for simplified processing of the filter output signals P1-PN by the voting logic circuit 20 as will be explained below.

Figure 4A:
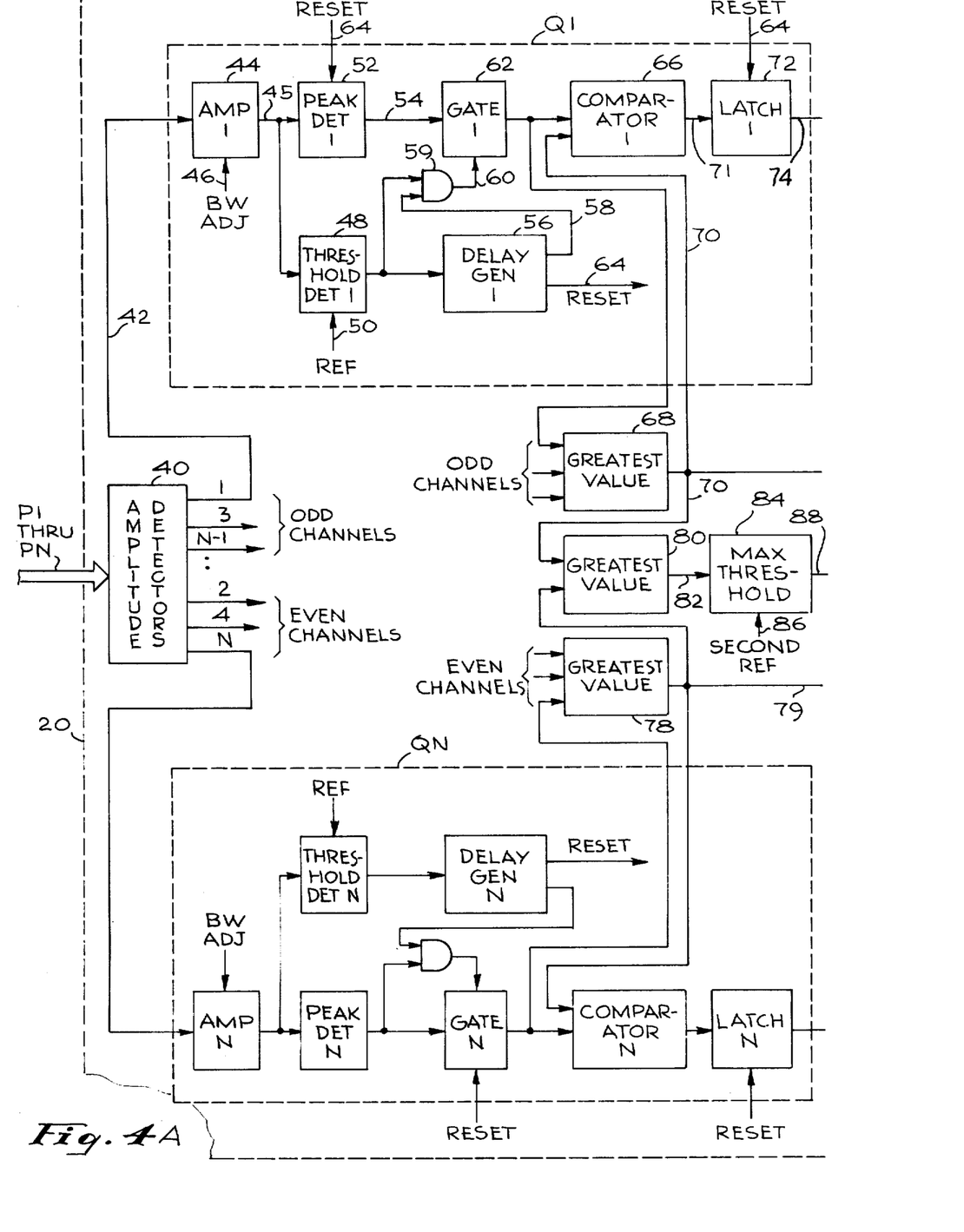
FIGS. 4A and 4B comprise a block and schematic diagram of the voting logic circuit shown in FIG. 1.

The voting logic circuit 20 includes a plurality of qualification circuits Q1 through QN as shown in FIG. 4A. The odd numbered qualification circuits Q1, Q3, . . . , provide certain tests to the outputs of the odd numbered filters F1, F3, . . . , and the even numbered qualification circuits Q2, Q4, . . . , provide certain tests to the outputs of the even numbered filters F2, F4, . . . . Through circuitry to be explained below, the qualification circuits determine which filter in the odd-numbered group has the highest amplitude output signal and which filter in the even-numbered group has the highest amplitude output signal, these signals being designated as first and second output signals, respectively. The characteristics of these output signals are tested against predetermined criteria as will be explained below before being used to determine the frequency of the received rf signal.

As shown in FIG. 4A, a plurality of amplitude detectors 40 provide detected output signals defining the amplitude envelope as a function of time of the output signals P1-PN from each of the filters F1-FN, respectively. The qualification circuits Q1-QN are identical, the first qualification circuit Q1 being described in detail as exemplary of the remaining qualification circuits. The detected output 42 from the first filter F1 is provided to a first amplifier 44. A post-detection bandwidth adjustment signal 46 is provided to the first amplifier 44 which is chosen to alter the bandpass characteristics of the first amplifier 44. This altering can filter out high frequency noise components of the detected signal 44 and provide a higher signal to noise ratio than that otherwise obtainable. Thus a more precise amplitude definition of the filter output signal P1 can be obtained for signals which do not require large processing bandwidths. The bandwidth adjustment signal 46 will be most applicable as the passbands of the filters F1-FN are increased. The output 45 of the first amplifier 44 is provided to a first threshold detector 48 in which its amplitude is compared to a first reference signal 50. The first threshold detector 48 is chosen so that no output signal will be provided if its input signal 45 is not greater than the first reference signal 50. A first peak detector 52 is also provided to generate an output signal 54 having a voltage related to the peak voltage of the first amplifier output signals 45. A first delay generator 56 is chosen to provide an output voltage 58 corresponding to the output of the threshold detector 48 but delayed by a predetermined amount. An AND gate 59 is provided which has the output of the threshold detector 48 as one input and the output 58 of the delay generator 56 as the other input. If the input 45 to the threshold detector 48 exceeds the reference voltage 50 for a period of time longer than that of the delay chosen for the delay generator 56, then the AND gate 59 will provide an output signal 60 which opens a first gating circuit 62. If the input 45 to the threshold detector 48 does not exceed the reference voltage 50 for a period of time longer than that of the predetermined delay, then a reset signal 64 is generated and provided to the first peak detector 52 which returns its output value to zero until another output signal from the first filter F1 is received. If the detected output signal 42 meets the criteria established by the first threshold detector 48 and the first delay generator 56, then the first gating circuit is unblocked, thereby allowing the peak detector output signal to pass to a first comparator 66.

A first greatest value circuit 68, to be described below, receives inputs from each of the gating circuits associated with the odd numbered qualification circuits. The first greatest value circuit 68 provides an output signal 70 equal to the input signal having the greatest magnitude. This signal 70 is provided as an input signal to each of the qualification circuit comparators. Referring again to the first comparator 66, if the output from the first gating circuit 62 and the output 70 from the first greatest value circuit 68 are equal, then a high output signal 71 generated by the first comparator 66 sets a first latch circuit 72. Since one of the odd numbered filter output signals will have a greatest value, one of the latch circuits in the odd-numbered qualification circuits will be set, the other latch circuits remaining in a reset configuration. All of the latch circuit output signals L1-LN are provided to the computer 24. Two of the latch circuit output signals will correspond to a set condition, thus defining the filter in the first group and the filter in the second group having the highest output signals. The even-channel filter output signals P2, P4, . . . PN, are processed in a manner identical to the odd channels, the output of the even-number gating circuits being provided to a second greatest value circuit 78 which in turn provides an output signal 79 corresponding to the maximum output signal from the even-numbered gating circuits. The outputs of the first and second greatest value circuits 68 and 78, respectively, are provided to a third greatest value circuit 80, the output 82 of which corresponds to the maximum value of all the gating circuit output signals. This output 82 is provided to a maximum threshold circuit 84 which has a second reference voltage 86 as an input. A high signal 88 is provided by the maximum threshold circuit 84 whenever the input signal 82 does not exceed the second reference voltage 86. The purpose of this circuit 84 is to eliminate especially strong signals which are predetermined not to be signals of interest due to their large amplitudes.

Several tests are conducted to determine if the filter output signals P1-PN are suitable for deriving a tuning signal 26 for the narrow band receiver 28. A validation AND gate 90 (FIG. 4B) has three inputs all of which must be high in order to provide an "in band" or validation signal 92 to the computer 24. The first input signal 88 is the output from the maximum threshold circuit 84 which as previously explained is high if the output of the third greatest value circuit 84 is below the second reference voltage 86. (It should be remembered that the minimum value test is conducted in the various qualification circuits as previously explained). The second test utilizes a NOR gate 94 which has two inputs consisting of output signals L1 and LN from the latch circuits in the first and last qualification circuits Q1 and QN. The NOR gate provides a high output whenever neither of these signals L1 or LN is high. The purpose of this test is to insure that neither the first filter F1 or the last filter FN have the highest output signals. As can be seen by referring to FIG. 3, these two filters have passbands designated as guard bands and are chosen to correpond to frequencies not anticipated for the received rf signal. The third test is accomplished in an adjacent channel test circuit 102 configured to provide a high output signal 104 when the two high latch circuit output signals correspond to adjacent channels. The purpose of this test is to insure that the two filters having the highest output signals correspond to adjacent portions of the search bandwidth. If they do not correspond to adjacent portions, then something is wrong and the narrowband receiver tuning signal should not be generated. If the three above-described tests are satisfied, then the validation AND gate 90 generates the in band signal 92.

In order for the computer 24 to generate the tuning signal 26, it is necessary (1) for it to be preprogrammed with the passband characteristics of each filter F1-FN (2) know which filter in each filter group that has the highest output signal, and (3) have a quantitative indication of the amplitude relationship between the two highest output signals. The first two have been discussed above. The third is generated by providing the output 70 of the first greatest value circuit 68 and the output 79 from the second greatest value circuit 78 to a difference circuit 108 (FIG. 4B) which provides an output equal to the difference between the two input signals 78 and 79. The output of the difference circuit 108 is provided to an analog-to-digital converter 110 whose output 112 is provided to the computer 24. Although a difference circuit 108 is shown in this embodiment, a ratio forming circuit could also be utilized. The basic requirement is that the computer 24 have a means for determining where the signal lies in the filter passband having the greatest amplitude output signal.

Figure 7:
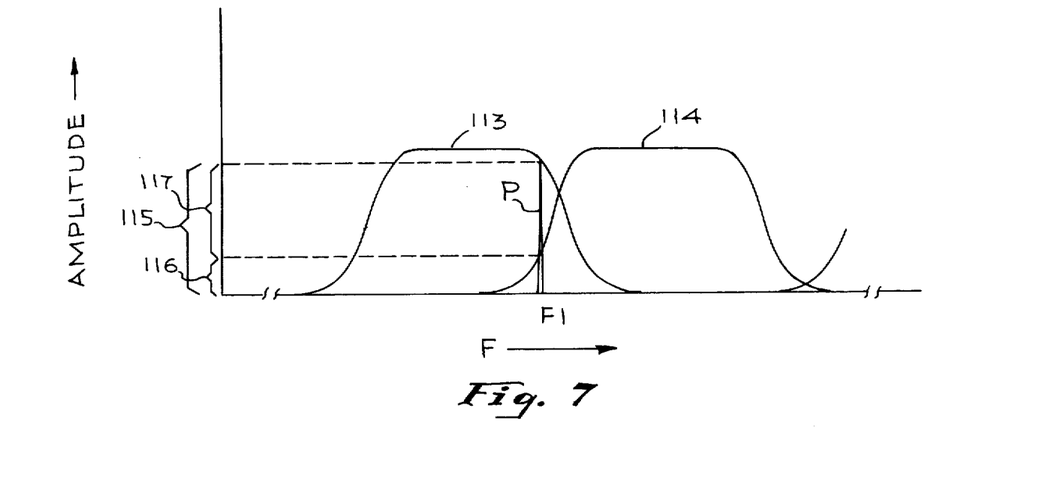
FIG. 7 is a waveform diagram showing data utilized by the computer to generate the tuning signal.

Generation of the tuning signal 26 by the computer 24 is further illustrated in FIG. 7. Here, the passband characteristics 113 of a filter in the first group and the passband characteristics 114 of a filter in the second group are shown, the two passbands defining contiguous portions of the predetermined search bandwidth. These two passband characteristics, as well as the passband characteristics of all the filters, have been predetermined, digitized, and stored in the computer 24. An incoming pulse P having a frequency F1 will cause the highest outpt signal from one group of filters to have an amplitude shown at 115, and the highest output signal from the other group of filters to have an amplitude shown at 116, their difference being shown at 117. Thus, from the various latch signals previously described, the computer 24 is able to identify the two filters having the highest amplitude output signals. Having made this identification, the computer 24 merely locates the difference value 117 so that it is bracketed by the predetermined passband characteristics 113 and 114, thus identifying the frequency F1 of the incoming pulse P.

To summarize operation of the channelizer and voting logic circuit, the IF signal 26 from the wideband receiver 14 is divided into first and second portions 32 and 34 which are then provided through rf circulators to odd-numbered filters F1, F3, ... F(N−1), and even-numbered filters F2, F4, ... FN, as shown in FIG. 2. This dividing of the IF signal 16 to interface with filters having non-contiguous passbands is important in order to utilize a simplified voting logic circuit provided by the invention. Referring now to FIG. 4A, the output signals P1-PN from the filters are detected and provided to corresponding qualification circuits Q1-QN, each of which amplifies its input signal and determines if it has an amplitude above a certain minimum threshold amplitude and has a width greater than a certain minimum width. If these criteria are satisfied, the signal is provided to a comparator which compares its amplitude with the signal in its group having the highest amplitude. A latch is set in the qualification circuit having the greatest signal amplitude. Thus, a qualification circuit corresponding to each filter group will have one of its latches in a set condition. The two signals having the greatest value are subtracted and provided to the computer which in turn calculates the precise frequency of the received rf signal. A means is also incorporated in the voting logic circuit to insure that the signal having the greatest amplitude is below a predetermined maximum threshold amplitude, is not contained in either of the guard bands previously defined, and are contained in adjacent portions of the search bandwidth. If these three criteria are satisfied, a validation AND gate 90 becomes high, thereby providing an in band signal to the computer which initiates a tuning signal calculation.

Figure 5:
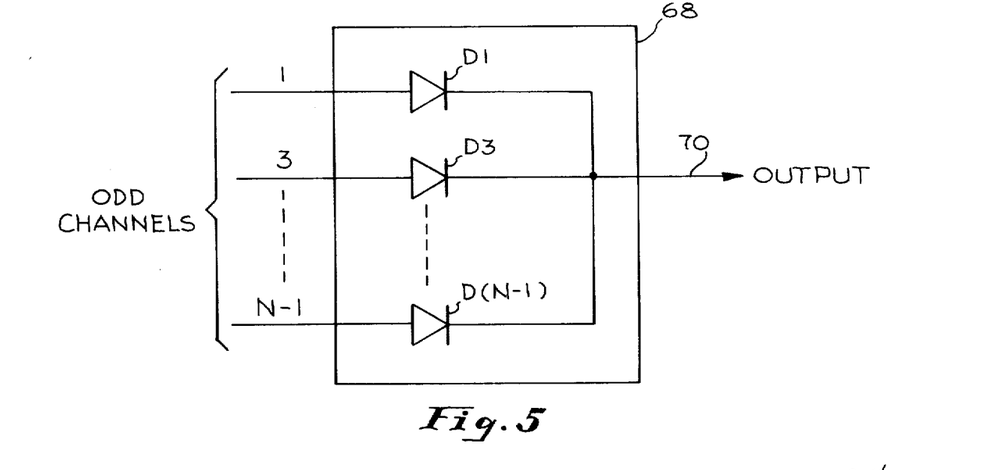
FIG. 5 is a schematic diagram of one of the greatest value circuits shown in FIG. 4A.

The three greatest value circuits 68, 78, and 80 comprise a plurality of interconnected diodes. Each of the greatest value circuits are essentially the same and will be explained in terms of first greatest value circuit 68 shown in FIG. 5. A plurality of output signals from the odd-numbered gating circuits are provided to corresponding diodes D1, D3, ... D(n−1). The outputs of these diodes are all interconnected and provide the output signal 70 as previously described. As one can readily appreciate, the diode having the highest input voltage provides an output voltage which in effect back-biases all the other diodes, thereby providing an output voltage which is equal to the highest input voltage less the voltage drop across the diode itself.

Figure 6:
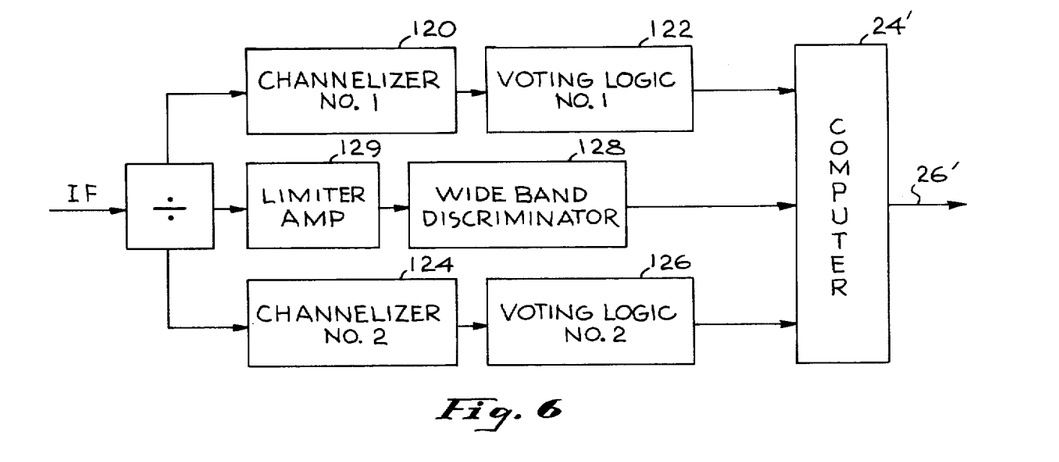
FIG. 6 is a block diagram of a channelized receiver provided by the invention utilized in conjunction with a wide band discriminator and a second channelized receiver.

Use of two channelized receivers provided by the invention in conjunction with a conventional wideband discriminator to increase the dynamic range of possible received rf signals is shown in FIG. 6. Here a first channelizer 120 and a first voting logic circuit 122 provide one signal channel, and a second channelizer 124 and a second voting logic circuit 126 provide a second signal channel. A wide band discriminator 128 provides a third signal channel. This discriminator 128 is a conventional delay line type preceeded by a limiter amplifier 129 which does not limit on noise, so that it is possible to detect an incoming pulse leading edge from amplitude information after the limiting process. The first and second channelizers 120 and 124, respectively, are chosen so that they have different bandwidths. For example, with a 2.2 gigahertz received IF signal, the first channelizer 120 may have eight filters of 20 megahertz bandwidth each and the second channelizer 124 may have four filters of 50 megahertz bandwidth each. A computer 24' can be configured in many ways to select the output of either the first channelizer and voting logic combination, the wide band discriminator, or the second channelizer and voting logic combination from which to generate a tuning signal 26', one way being to select on the basis of amplitude. As can be readily appreciated, any number of channelizers having different bandwidths could be used in conjunction with the wideband discriminator. One advantage of incorporating a wideband discriminator is to increase the dynamic range of the combination in order to be able to process very strong received rf signals. The wideband discriminator can accurately determine the frequency of a very strong signal whereas such a signal could saturate several of the channelizer filters, thereby reducing the computer's capability to develop an accurate tuning signal. However, as the received rf signal decreases in amplitude, the more advantageous it becomes to use a channelizer, thereby increasing the accuracy of the frequency determination process. Thus, the configuration of FIG. 6 shows two channelizers in conjunction with a wide band discriminator. However, one, three, four or any number of channelizers in conjunction with the wide band discriminator could be chosen, the actual configuration being determined by the accuracy to which the received rf signal frequency is desired. In addition, the filters could have been divided into more than two groups utilizing an appropriately configured voting logic circuit.

Figure 4B:
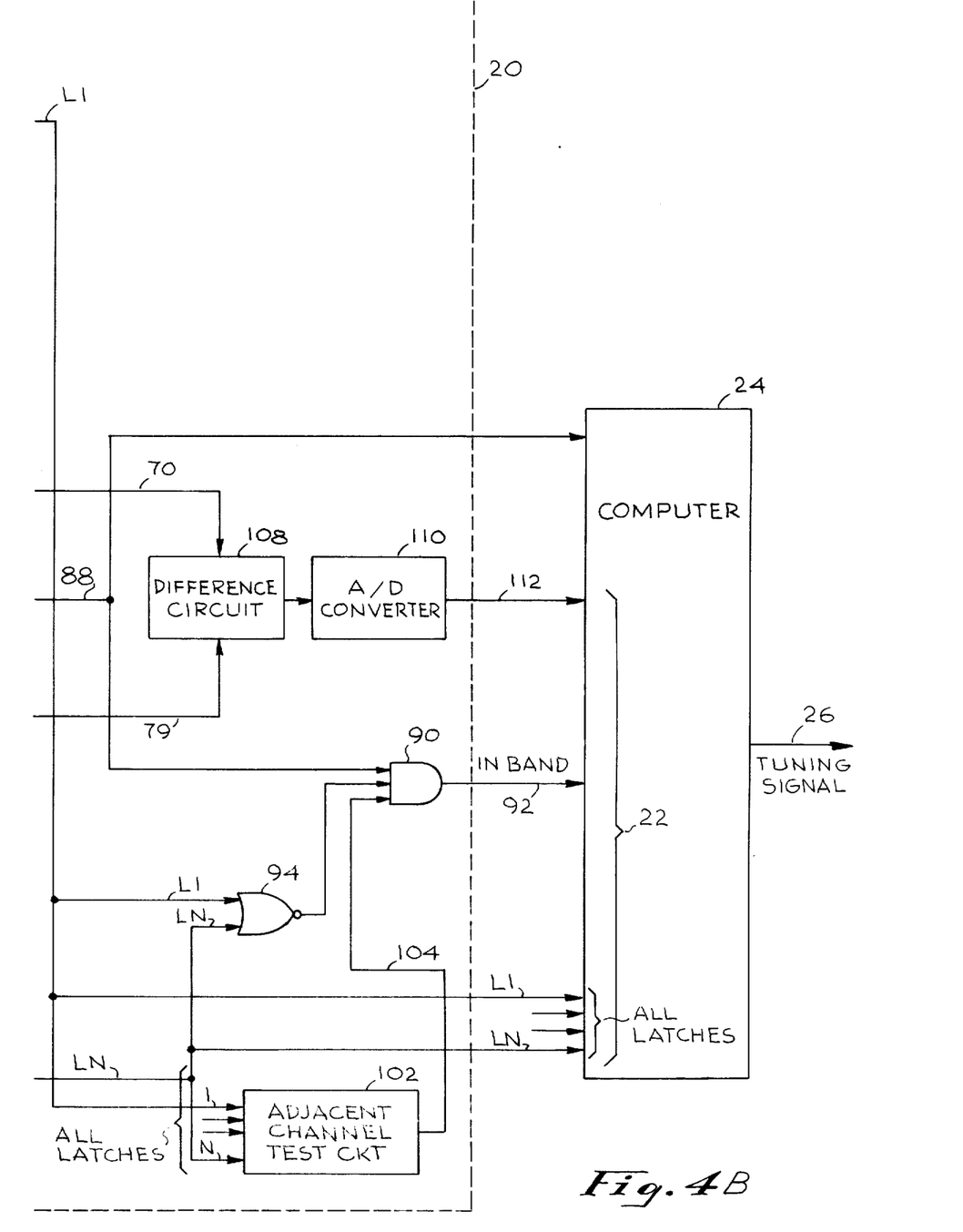

Several implementations for determining whether the first channelizer 120, the second channelizer 124 or the wideband discriminator 128 should be utilized to generate the tuning signal 26' will be immediately suggested to those familiar with the electronic processing art. One such implementation utilizes the computer 24' for making the determination. As previously explained, whenever the input signal to the maximum threshold detector 84 is above the second reference voltage 86, the output signal 88 from the detector 84 is low. As can be seen, this output signal 88 is provided to the computer 24 as can be seen in FIG. 4B. The computer 24' is preprogrammed to select the wideband discriminator 128 output for generating the tuning signal 26' whenever each channelizer 120 and 124 maximum threshold detector output signal 88 is low. The signal level at which the output of the wideband discriminator 128 is selected can be altered by adjustment of the second reference voltage 86. If the maximum threshold detector output signal 88 is high, the computer is then programmed to look at the latch circuit outputs 74 (shown in FIG. 4A) for each of the channelizers 120 and 124. If the latch circuit outputs 74 for one of the channelizers 120 or 124 are all low and the other channelizer has high latch circuit outputs, then the channelizer having the high latch circuit outputs is selected for generation of the tuning signal 26'. If both channelizers 120 and 124 have high latch circuit outputs 74, then the channelizer having the narrower bandwidth filters is selected for generating the tuning signal 26'.

Thus, a channelized receiver has been described in which the division of a received rf or IF signal into two portions each of which is provided to rf filters defining non-contiguous passband segments of a search bandwidth allows a simplified voting logic circuit to provide necessary information to a computer for computation of a tuning signal to be utilized for tuning a narrow band receiver.

I claim:

1. A channelized receiver for determining the frequency of a received rf signal, the frequency being within a predetermined search bandwidth, comprising:
 a plurality of filter means each of which has a passband covering a portion of said predetermined search bandwidth, said plurality of filter means being divided into a first group and a second group of filter means, each group containing filter means defining alternate portions of said predetermined search bandwidth with respect to the filter means of the other group;
 splitting means for dividing said received rf signal into first and second portions;
 first means for applying said rf signal first portion to said first group of filter means;
 second means for applying said rf signal second portion to said second group of filter means;
 first means for determining the filter means in said first group having the highest amplitude output signal, said signal being designated as a first output signal;
 second means for determining the filter means in said second group having the highest amplitude output signal, said signal being designated as a second output signal; and
 comparison means for determining an amplitude relationship between said first and second output signals, said amplitude relationship being related to the frequency of said received rf signal.

2. The channelized receiver of claim 1 further comprising means for generating an in band signal when said first and second output signals are derived from filter means defining contiguous portions of said predetermined search bandwidth.

3. The channelized receiver of claim 1 wherein said predetermined search bandwidth is divided into N adjacent passband portions, and said first group of filter means comprises rf filters each having a passband corresponding to alternate passband portions of said predetermined search bandwidth beginning with the first portion, and said second group of filter means comprises rf filters each having a passband corresponding to alternate passband portions of said predetermined search bandwidth beginning with the second portion.

4. The channelized receiver of claim 3 wherein said first means for applying comprises a first plurality of serially connected rf circulators, the first circulator of which is connected to said rf signal first portion, each circulator output of said first plurality of rf circulators being connected to a corresponding filter means in said first group of filter means, and said second means for applying comprises a second plurality of serially connected rf circulators, the first circulator of which is connected to said rf signal second portion, each circulator output of said second plurality of rf circulators being connected to a corresponding filter means in said second group of filter means.

5. The channelized receiver of claim 3 wherein said first means and second means for determining each comprises:
 a plurality of pulse testing circuits corresponding to each of said rf filter output signals, each of said pulse testing circuits comprising a peak detector for providing a voltage related to the amplitude of its corresponding rf filter output signal; and
 comparator means for indicating the rf filter having the highest amplitude output signal.

6. The channelized receiver of claim 5 wherein each of said plurality of pulse testing circuits comprises means for blocking the output of its peak detector when it is below a predetermined voltage level.

7. The channelized receiver of claim 6 wherein each of said plurality of pulse testing circuits comprises means for blocking the output of its peak detector when its corresponding rf filter output signal does not have a time duration at least equal to a predetermined time duration.

8. The channelized receiver of claim 7 further comprising means for generating as in band signal when said first and second output signals are derived from rf filters defining contiguous portions of said predetermined search bandwidth and said first and second output signals are below a predetermined threshold level.

9. The channelized receiver of claim 8 further comprising means for blocking said in band signal if either of said first and second output signals are derived from a bandwidth portion including the lowest or highest frequencies of said predetermined search bandwidth.

10. The channelized receiver of claim 5 wherein said first and second means for determining each further comprises an amplitude detection means for providing an amplitude envelope to each of said pulse testing circuits corresponding to each of said rf filter output signals.

11. The channelized receiver of claim 3 wherein N is an even number.

12. A radar intercept receiving system having a first channelized receiver for determining the frequency of a received rf signal within a predetermined search bandwidth, said first channelized receiver comprising:
 a plurality of rf filters each having a passband corresponding to a different portion of said search bandwidth;
 said rf filters comprising at least two groups, each group containing filters corresponding to alternate search bandwidth portions;
 means for providing a portion of said received rf signal to each of said rf filter groups;
 first means for determining which filter in each of said groups of filters has the highest magnitude output signal, the two highest magnitude output signals being designated as a first output signal and a second output;
 second means for determining if said first and second output signals are in adjacent bandwidth portions of said predetermined search bandwidth;
 third means for determining an amplitude relationship between said first and second output signals; and
 means responsive to said first, second and third means for generating a tuning signal related to the frequency of said received rf signal.

13. The receiving system of claim 12 further comprising:
 a wide band discriminator for determining the frequency of said receiver rf signal; and wherein
 said means for generating a tuning signal is selectively responsive to either said first, second and third means or said wideband discriminator.

14. The receiving system of claim 12 further comprising:
 a second channelized receiver substantially identical to said first channelized receiver but having bandwidth portions different from said first channelized receiver bandwidth portions;

a wide band discriminator for determining the frequency of said receiver rf signal; and wherein said means for generating a tuning signal is selectively responsive to either said first channelized receiver first, second and third means, or said second channelized receiver, or said wideband discriminator.

15. The receiving system of claim 12 wherein said means responsive to said first, second and third means comprises a computer.

16. A channelized receiver for determining the frequency of a received rf signal, the frequency being within a predetermined search bandwidth, comprising:

a plurality of rf filters each of which has a passband covering a portion of said predetermined search bandwidth, said rf filters being divided into at least two groups, each group containing rf filters defining non-contiguous portions of said predetermined search bandwidth;

means for applying portions of said received rf signal to each group of rf filters;

means for determining which filter in each group has the highest amplitude output signal, the two highest amplitude signals being designated as first and second output signals; and comparison means for determining an amplitude relationship between said first and second output signals, said amplitude relationship being related to the frequency of said received rf signal.

17. The channelized receiver of claim 16 wherein said at least two groups comprises two groups, said receiver further comprising means for generating in inband signal when said first and second output signals are derived from rf filters defining contiguous portions of said predetermined search bandwidth.

18. A method for determining the frequency of a received rf signal within a predetermined search bandwidth comprising the steps of:

dividing a plurality of filter means into at least a first and second group of filters each filter having a passband covering a portion of said predetermined bandwidth, each group of filters containing filters defining alternate portions of said predetermined search bandwidth with respect to filters of the other groups;

applying said received rf signals to said at least two groups of rf filters;

determining the filter in each of said filter groups having the highest amplitude output signal;

selecting the two filter groups having the highest amplitude output signal, said output signals being designated as first and second output signals; and determining an amplitude relationship between said first and second output signals, said amplitude relationship being related to the frequency of said received rf signal.

19. The method of claim 18 wherein said at least two groups of filters comprises two groups of filters, said method further comprising the step of dividing the predetermined search bandwidth into an even number, N, of adjacent passband portions so that said first group of filter means comprises filters each having a passband corresponding to alternate passband portions of said predetermined bandwidth beginning with the first portion, and said second group of filter means comprises filters each having a passband corresponding to alternate passband portions of said predetermined bandwidth beginning with the second portion.

* * * * *